United States Patent Office 3,302,110
Patented Jan. 31, 1967

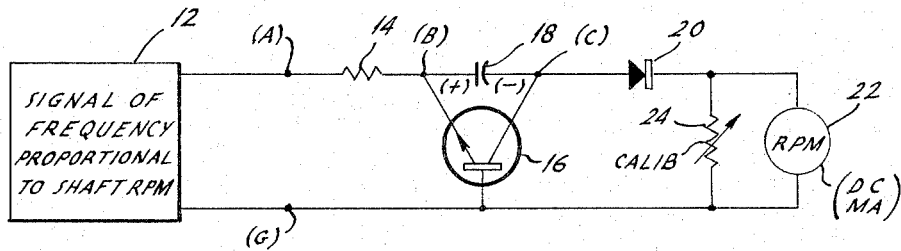
FIG. 1. TACHOMETER CIRCUIT
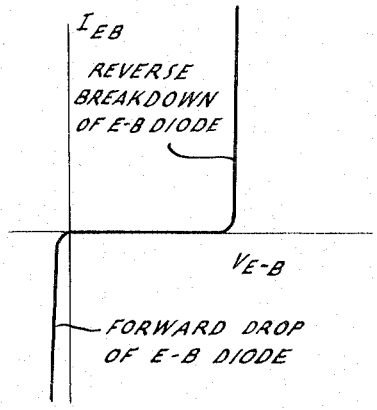
FIG. 2. BASE-EMITTER CHARACTERISTIC OF TRANSISTOR 16
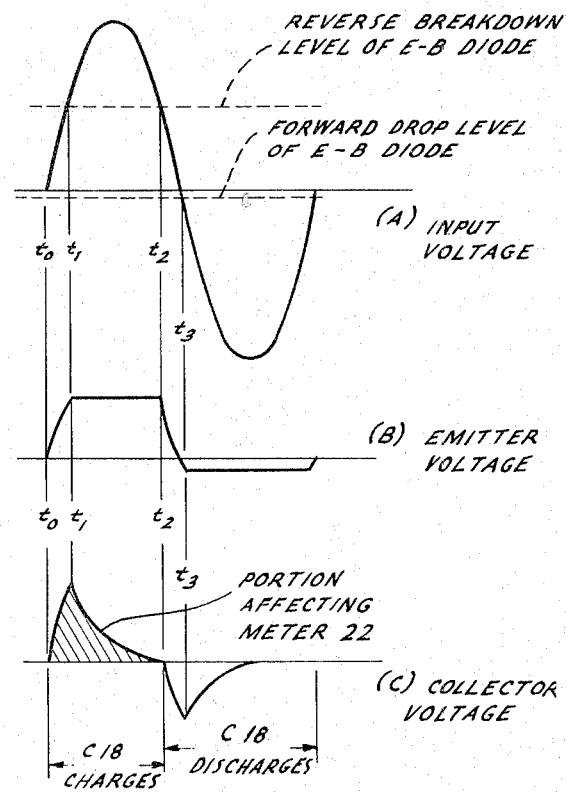
FIG. 3. WAVEFORMS IN FIG. 1. CIRCUIT
INVENTOR.
ABRAM HOPENGARTEN
BY D.R. Pressman
ATTORNEY

3,302,110
ELECTRONIC TACHOMETER AND FREQUENCY MEASURING CIRCUIT
Abram Hopengarten, Lafayette Hill, Pa., assignor to Philco-Ford Corporation, a corporation of Delaware
Filed Feb. 13, 1964, Ser. No. 344,707
3 Claims. (Cl. 324—78)

This invention relates to a new and improved electronic tachometer.

Electronic tachometers are designed to receive an electrical input signal of a frequency proportion to the rotational speed of a member and, by means of electronic circuitry, provide an indication proportional to said frequency on a scale suitable calibrated in rotational speed, for example in revolutions per minute.

Electronic tachometers have numerous advantages over their mechanical counterparts which operate from a rotating shaft connected to the rotating member. Electronic tachometers are lighter, cheaper, adaptable to telemetric use, can be recalibrated for various applications readily, do not require as many special components, and have fewer moving parts. Although by no means limited to such use, electronic tachometers have become popular accessories for electrically ignited internal combustion engines, particularly those found in automobiles, one reason being that the required electrical input is readily obtainable from the primary of the engine's ignition coil.

The most convenient and cheapest indicating means for an electronic tachometer is usually a D.C. milliammeter whose scale is calibrated in r.p.m. The function of the electronic circuitry in such an instrument is thus to convert a variable frequency input signal to a proportionally variable direct current output signal for driving the indicating ammeter. The magnitude of the D.C. output signal should be affected only by changes in the frequency of the input signal and not be changes in its amplitude, waveshape, or duty cycle.

One type of circuit heretofore used in an electronic tachometer has been a monostable multivibrator pulsed by the input signal and arranged to provide a train of D.C. output pulses for driving the ammeter, the width and amplitude of the pulses being dependent solely on the characteristics of the monostable multivibrator and not on any characteristic of the input signal. This type of system requires numerous electronic components and thus has the disadvantages of high cost and poor reliability.

Another type of circuit heretofore used which also suffers from the above disadvantages operates by rectifying and limiting the input voltage to form constant amplitude D.C. pulses, differentiating these pulses to form A.C. pulse pair of constant width, and then rectifying these pairs to provide D.C. pulses of constant amplitude and width for driving the indicating meter.

Objects

Accordingly, several objects of the present invention are:

To provide a novel and improved electronic tachometer,

To provide an electronic tachometer having a simple, inexpensive construction,

To provide a unique transistorized tachometer which obviates many disadvantages of prior-art systems and which is novel, accurate, and reliable, and To provide a transistorized electronic tachometer which is insensitive to changes in input voltage amplitude or duty cycle.

Other object and advantages of the present invention will become apparent from a consideration of the ensuing description thereof.

Summary

According to one preferred form of the present invention, the emitter and base of a transistor are connected across a signal source whose frequency is proportional to the rotational speed of a rotating member. A diode and a current sensitive indicating device calibrated in units of rotational speed are connected in series across the collector and base of the transistor, and a differentiating capacitor is connected across the emitter and collector of the transistor.

Drawing

FIG. 1 shows a preferred form of the invention.

FIG. 2 shows the base-emitter current-voltage characteristic of the transistor in the circuit of FIG. 1.

FIG. 3 shows voltage waveforms A, B, and C found at the correspondingly lettered points in the circuit of FIG. 1.

Description of circuit

The tachometer circuit of FIG. 1 is responsive to the signal supplied by a source 12 which has output terminals A and G. Source 12 is arranged to supply a signal whose frequency is proportional to the unknown rotational speed of a member. The tachometer circuit includes a limiting resistor 14 having one terminal connected to terminal A of source 12, a control transistor 16 whose emitter is connected to the other terminal B of resistor 14 and whose base is connected to terminal G of source 12, a differentiating capacitor 18 connected across the emitter and collector of transistor 16, a blocking diode 20 whose anode is connected to the collector terminal C of transistor 16, a milliammeter 22 calibrated in rotational speed, for example r.p.m., connected to the cathode of diode 20 and terminal G of source 12, and a calibrating variable resistor 24 connected across meter 22.

Source 12 represents any means for supplying any type of repetitive waveform whose frequency is proportional to the unknown rotational speed of a rotating member. If the member is the crankshaft of an internal combustion engine, source 12 may represent, for instance, one of the following: (1) a transformer whose primary is in series with the primary winding of the engine's ignition coil and whose secondary is connected across terminals A and G, (2) a voltage tap wherein terminals A and G are connected directly across the primary winding of the ignition coil or the primary circuit's interrupting means (breaker points or a switching transistor), (3) a voltage tap with terminals A and G connected, via suitable voltage dropping resistors, across any points in the high voltage portion of the ignition circuit. If the rotating member is an armature of an electrical machine, point A and G may be connected across any points which provide a voltage whose frequency is proportional to the rotational speed of the armature. If the rotating member is merely a shaft which is not associated with any electrical signal, an appropriate electrical signal can be generated for instance, by either: (1) a battery intermittently connectable to points A and G by means of a rotating contact positioned on said shaft, or (2) a magnetic member positioned on said shaft arranged to generate a voltage pulse each time it rotates past a fixed coil whose windings are connected to point A and G.

The signal supplied across points A and G can be any shape repetitive waveform. For exemplary purposes the signal is represented as one cycle of a sine wave in FIG. 3. However if source 12 represents means connected to the primary winding of an internal combustion engine's ignition coil, a single cycle of the waveform may resemble a damped sine wave. The effective duty cycle of the signal can be very short. The amplitude of the wave must of course be within limits dictated by the components of the circuit; however ready use can be made of a step-up or step-down transformer or dropping impedances to provide a wave of proper amplitude.

If signal source 12 is connected across points A and G so that point A intermittently goes positive, transistor 16 should be of the NPN type and diode 20 should have the polarity shown. If source 12 causes point A to go negative, a PNP transistor must be used for transistor 16 and the polarity of diode 20 must be reversed.

Optionally a high frequency bypass capacitor can be connected across points A and G to eliminate any spurious high frequency components as might be present, for example, in the signal from an automobile ignition system.

Limiting resistor 14 allows the voltage across points B–G to differ from that across points A–G when the circuit impedance between points B and G is reduced. It will be obvious, therefore, that resistor 14 may be omitted if the internal impedance of source 12 is high.

Transistor 16 is used both in its forward conduction and reverse breakdown modes; its base-emitter voltage-current characteristic is illustrated in FIG. 2. When the emitter is made positive with respect to the base (quadrant I) the emitter-base diode is back-biased and little current flows until the breakdown level is reached, at which time the current increases sharply. When the emitter is made negative (quadrant III) the emitter-base diode is forward biased and a large current flow occurs as soon as the forward drop or contact potential is exceeded. The emitter and collector connections of transistor 16 can be reversed provided the collector junction has a similar breakdown level.

Meter 22 is a milliammeter whose scale is appropriately calibrated in units of rotational speed, for example r.p.m. Resistor 24 is adjusted to calibrate the circuit. In lieu of a milliammeter, a voltmeter similarly calibrated can be used if the value of resistor 24 is adjusted to approximately the impedance of a milliammeter.

Diode 20 represents any unilaterally conductive device. Its function is to prevent reverse currents in meter 22. Diode 20 may be omitted if meter 22 is insensitive to reverse currents.

*Operation of circuit*

The operation of the tachometer circuit will be explained with reference to the illustrated waveforms of FIG. 3 which are not to scale.

Assume that waveform A is applied across points A and G. During time $t_0$ to $t_1$ waveworm A will reverse-bias the emitter-base junction but will be insufficient to break down the same. Consequently the emitter-base path will present a high impedance and current will be routed through the path consisting of resistor 14, capacitor 18, diode 20, and meter 22. The voltage at the emitter or left hand terminal of capacitor 18 (waveform B will be only slightly integrated and hence almost identical to the input voltage during this interval. The voltage at the collector or right hand terminal of capacitor 18 (waveform C will also be similar to the input voltage since the charging time constant of capacitor 18 is long compared to the interval $t_0$–$t_1$. During this interval the collector-base junction will also present a high impedance since the collector will also be positive with respect to the base.

During the interval from $t_1$ to $t_2$, when the input voltage exceeds the reverse breakdown level of the emitter-base diode, the current from source 12 will be shunted through the low impedance path of the emitter-base diode and the waveform at point B will be a clipped version of the input voltage, as indicated in waveform B of FIG. 3. Since the left terminal of capacitor 18 is held at a constant positive potential and the right terminal is connected to ground via diode 20 and meter 22 (the collector-base junction remaining reverse biased), capacitor 18 will charge as indicated during this interval. The charging current will flow through diode 20 and meter 22, decaying exponentially as indicated by waveform C. The charging current flowing through meter 22 from time $t_0$ to $t_2$ will have a shape proportional to the voltage indicated by waveform C substantially irrespective of the magnitude, shape, or duty cycle of the input voltage, so long as its positive excursion exceeds the reverse breakdown level of the emitter-base diode of transistor 16. This is because the shape of waveform C from time $t_0$ to $t_2$ is determined almost entirely by the fixed RC differentiating circuit consisting of capacitor 18 and diode 20, resistor 24, and meter 22.

During the interval from time $t_2$ to $t_3$, when the input voltage falls below the reverse breakdown level of the emitter-base diode, the emitter-base junction will present a high impedance. The voltage on the left terminal of capacitor 18 will also decrease and substantially follow the input voltage (waveform B). The voltage on the right terminal of capacitor 18 (waveform C) will tend to follow waveform B and hence will fall below the potential of terminal G, forward biasing the collector-base junction of transistor 16. This will allow capacitor 18 to partially discharge during this interval through the emitter-collector path of transistor 16. No further current will flow through meter 18 since diode 20 will be back-biased. Hence only the positive or shaded part of waveform C will cause current to flow through meter 18.

After time $t_3$, the input voltage will be negative enough to exceed the forward drop of the emitter-base diode of transistor 16, thus forward biasing the same. The emitter voltage will remain at the forward drop level during this time. Since both emitter and collector junctions are forward biased, the discharge of capacitor 18 will be accelerated through transistor 16.

The number of current pulses similar to the shaded area of waveform C which will flow through meter 22 in any time period will be proportional to the frequency of the input voltage. Since the frequency of these pulses will be too great for the movement of meter 22 to follow, meter 22 will provide a constant indication proportional to the average direct current of the pulses and hence their frequency. Meter 22 is thus effectively an intergating device.

The circuit parameters must be chosen so that capacitor 18 can substantially completely charge and discharge during the pertinent time intervals.

While the invention has been described primarily as a tachometer, it will be apparent that with proper calibration of meter 22 the circuit of the invention will also serve as a frequency meter adapted to measure the frequency of any signal represented by source 10.

Although the invention has been described with reference to the preferred embodiment thereof, it will be apparent that various modifications and other embodiments thereof will occur to those skilled in the art within the scope of the invention. Accordingly it is desired that the scope of the invention be limited by the appended claims only.

I claim:
1. In combination:
   (a) a source having two terminals for supplying a signal having a repetitive waveform,
   (b) a limiting impedance,
   (c) a capacitor,
   (d) a transistor having a base electrode and two additional electrodes comprising a collector and emitter, one of said additional electrodes being connected to one of the terminals of said source via said limiting impedance, the base of said transistor connected to the other terminal of said source, said capacitor connected between said additional electrodes, said transistor being of a type such that said signal will cause a reverse breakdown of the junction between one of said additional electrodes and said base during each cycle of said signal, and
(e) a diode and a current indicating means connected in series across the other of said additional electrodes of said transistor and said base.

2. A system for measuring the frequency of a signal having a periodic waveform, comprising:
(a) a pair of input terminals, said signal being supplied across said input terminals,
(b) a limiting impedance, one terminal of which is connected to one of said input terminals,
(c) a transistor having its emitter connected to the other terminal of said limiting impedance and its base connected to the other of said input terminals, said transistor being of a type such that its emitter-base junction will be driven into the reverse breakdown region during each cycle of said signal,
(d) a capacitor connected between the emitter and collector of said transistor, and
(e) a diode and a current sensitive device calibrated in units of frequency connected in series between said collector and said base.

3. Apparatus for measuring the frequency of a signal having a repetitive waveform, comprising:
(a) means for supplying said signal across two terminals such that the voltage of said signal will be lowered when the load impedance seen by said signal across said two terminals is reduced,
(b) a transistor having a base electrode and two additional electrodes comprising an emitter and collector, said base electrode being connected to one of said two terminals and one of said additional electrodes being connected to the other of said two terminals, said transistor being of a type such that said signal will cause a reverse breakdown of the junction between said one of said additional electrodes and said base during each cycle of said signal,
(c) a capacitor connected between the emitter and collector of said transistor,
(d) current indicating means connected between the other of said additional electrodes and the base of said transistor, and
(e) means for allowing curent to flow through said current indicating means in a single direction only.

References Cited by the Examiner
UNITED STATES PATENTS

| | | | |
|---|---|---|---|
| 2,983,868 | 5/1961 | Silberbach | 324—70 |
| 3,005,155 | 10/1961 | Faria | 324—70 |
| 3,193,732 | 7/1965 | Jamieson | 307—88.5 |
| 3,219,926 | 11/1965 | Dion | 324—70 |
| 3,233,175 | 2/1966 | Faria | 324—70 |

WALTER L. CARLSON, *Primary Examiner.*

M. J. LYNCH, *Assistant Examiner.*